(12) United States Patent
Eller et al.

(10) Patent No.: US 10,926,470 B2
(45) Date of Patent: Feb. 23, 2021

(54) METHOD FOR PRODUCING SILICONE ELASTOMER ARTICLES WITH ELEVATED PRINT QUALITY

(71) Applicant: Wacker Chemie AG, Munich (DE)

(72) Inventors: Klaus Eller, Burghausen (DE); Siegfried Dormeier, Stubenberg (DE); Ernst Selbertinger, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 235 days.

(21) Appl. No.: 15/779,627

(22) PCT Filed: Oct. 17, 2016

(86) PCT No.: PCT/EP2016/074867
§ 371 (c)(1),
(2) Date: May 29, 2018

(87) PCT Pub. No.: WO2018/072809
PCT Pub. Date: Apr. 26, 2018

(65) Prior Publication Data
US 2018/0370141 A1 Dec. 27, 2018

(51) Int. Cl.
*B29C 64/124* (2017.01)
*B29C 64/371* (2017.01)
(Continued)

(52) U.S. Cl.
CPC .......... *B29C 64/371* (2017.08); *B29C 64/106* (2017.08); *B29C 64/112* (2017.08); *B29C 64/124* (2017.08); *B29C 64/129* (2017.08); *B29C 64/194* (2017.08); *B29C 64/264* (2017.08); *B29C 64/291* (2017.08); *B33Y 10/00* (2014.12); *B01J 2219/0894* (2013.01); (Continued)

(58) Field of Classification Search
CPC ...................................................... B29C 64/112
See application file for complete search history.

(56) References Cited

U.S. PATENT DOCUMENTS

| 5,160,939 A | 11/1992 | Bajeux et al. |
| 5,738,817 A * | 4/1998 | Danforth ................. B29C 41/36 264/603 |

(Continued)

FOREIGN PATENT DOCUMENTS

| DE | 68910459 T2 | 3/1994 |
| DE | 69808104 T2 | 5/2003 |

(Continued)

OTHER PUBLICATIONS

A. Gebhardt, Generative Fertigungsverfahren, Carl Hanser Verlag, München, 2013, 15 pages. front matter, table of contents only.

(Continued)

*Primary Examiner* — Benjamin A Schiffman
(74) *Attorney, Agent, or Firm* — Brooks Kushman P.C.

(57) ABSTRACT

In an additive 3D printing method for production of shaped articles from silicone elastomers, an elastomeric shaped body is built up step by step, by repeatedly precisely positioning portions of the crosslinkable silicone material and crosslinking by means of electromagnetic radiation. Charges that occur on the surface of the print material or on the article are neutralized by means of an ionization system.

13 Claims, 5 Drawing Sheets

(51) Int. Cl.
  *B33Y 10/00*      (2015.01)
  *B29C 64/112*     (2017.01)
  *B29C 64/106*     (2017.01)
  *B29C 64/194*     (2017.01)
  *B29C 64/264*     (2017.01)
  *B29C 64/129*     (2017.01)
  *B29C 64/291*     (2017.01)
  *B33Y 30/00*          (2015.01)
  *B33Y 40/00*          (2020.01)
  *B29C 64/209*         (2017.01)
  *B29K 21/00*          (2006.01)
  *B33Y 50/02*          (2015.01)
  *B33Y 70/00*          (2020.01)
  *B29C 64/393*         (2017.01)
  *B29C 64/40*          (2017.01)
  *B29K 83/00*          (2006.01)
  *B29K 105/24*         (2006.01)

(52) U.S. Cl.
  CPC ..... *B01J 2219/0896* (2013.01); *B29C 64/209* (2017.08); *B29C 64/393* (2017.08); *B29C 64/40* (2017.08); *B29K 2021/006* (2013.01); *B29K 2083/005* (2013.01); *B29K 2105/24* (2013.01); *B33Y 30/00* (2014.12); *B33Y 40/00* (2014.12); *B33Y 50/02* (2014.12); *B33Y 70/00* (2014.12)

(56) References Cited

U.S. PATENT DOCUMENTS

| | | | |
|---|---|---|---|
| 6,511,164 B1 | 1/2003 | Bajeux et al. | |
| 7,285,234 B2* | 10/2007 | Pfeifer | B22F 3/004 |
| | | | 264/113 |
| 7,329,379 B2* | 2/2008 | Boyd | B29C 64/188 |
| | | | 264/401 |
| 8,083,513 B2* | 12/2011 | Montero-Escuder | |
| | | | B29C 64/153 |
| | | | 425/375 |
| 9,216,547 B2* | 12/2015 | Elsey | B29C 64/135 |
| 9,539,765 B2* | 1/2017 | Kraibuhler | B29C 64/112 |
| 9,802,363 B2* | 10/2017 | Denda | B33Y 99/00 |
| 9,891,346 B2* | 2/2018 | Van De Vrie | B41J 11/002 |
| 2006/0159869 A1* | 7/2006 | Kramer | B29C 64/112 |
| | | | 428/15 |
| 2015/0246483 A1* | 9/2015 | Goto | B33Y 10/00 |
| | | | 428/206 |
| 2015/0273766 A1* | 10/2015 | Denda | B29C 64/165 |
| | | | 264/483 |
| 2016/0136888 A1* | 5/2016 | Bayley | A61K 9/1277 |
| | | | 424/450 |
| 2016/0193785 A1* | 7/2016 | Bell | B29C 64/118 |
| | | | 264/255 |
| 2016/0198576 A1* | 7/2016 | Lewis | B29C 64/00 |
| | | | 361/761 |
| 2016/0271874 A1* | 9/2016 | Tsai | B33Y 10/00 |
| 2017/0312981 A1 | 11/2017 | Selbertinger et al. | |
| 2018/0207863 A1* | 7/2018 | Porter | B29C 64/241 |
| 2019/0176401 A1* | 6/2019 | Fischer | B29B 13/02 |

FOREIGN PATENT DOCUMENTS

| | | |
|---|---|---|
| DE | 102005000983 A1 | 7/2006 |
| DE | 202013011396 U1 | 3/2014 |
| DE | 202016000367 U1 | 3/2016 |
| EP | 2923824 A1 | 9/2015 |
| GB | 2508204 A | 5/2014 |
| WO | 2014209994 A2 | 12/2014 |
| WO | 15059502 A1 | 4/2015 |
| WO | 2015107333 A1 | 7/2015 |
| WO | 2016071241 A1 | 5/2016 |

OTHER PUBLICATIONS

Deanna M. Jacobs, "Electrostatic discharge-understanding and controlling the phenomenon: A handbook for packaging professionals", p. 21, 1991, 111 pages.

\* cited by examiner

METHOD FOR PRODUCING SILICONE ELASTOMER ARTICLES WITH ELEVATED PRINT QUALITY

CROSS REFERENCE TO RELATED APPLICATIONS

This application is the U.S. National Phase of PCT Appln. No. PCT/EP2016/074867 filed Oct. 17, 2016, the disclosure of which is incorporated in its entirety by reference herein.

BACKGROUND OF THE INVENTION

1. Field of the Invention

The invention relates to an additive 3D printing method for production of elastomeric shaped articles from radiation-crosslinking silicone materials, which is characterized in that the elastomeric shaped body is built up step by step, by repeatedly precisely positioning portions of the crosslinkable silicone elastomer print material and crosslinking them by means of electromagnetic radiation. Charges that occur on the surface of the print material are neutralized by means of an ionization system.

2. Description of the Related Art

There are numerous processing methods available for the production of elastomeric shaped articles from crosslinkable silicone rubber compounds. According to the consistency and mechanism of crosslinking of the silicone elastomer compound, shaped articles can be produced, for example, by injection moulding, by the compression method, by the extrusion method, casting, etc. The properties of the shaped silicone article formed (hardness, breaking strength, extensibility, colour etc.) are determined essentially by the physical composition of the crosslinkable silicone rubber compound (and also by the processing conditions such as pressure and temperature); in other words, these processes typically afford largely isotropic shaped silicone articles with high values of mechanical and optical properties.

However, a existing methods are increasingly meeting their limits when shaped silicone articles of more complex geometry, of different material composition and/or of variable profiles of properties are required. For example, the production of injection moulds that are suitable for this purpose is becoming increasingly laborious and costly or is fundamentally not possible. Such profiles of requirements exist, for example, in the field of exo- and endoprotheses and especially epitheses (e.g. synthetic auricles, the softer and harder sites of which (skin, cartilage) merge continuously into one another). Nor is it possible to implement very complex structures as known from bionics by means of conventional processing methods. The general trend toward individualization and individual adaptation of consumer articles is additionally requiring smaller numbers of items, which means that conventional methods are no longer efficient. The same applies to the production of prototypes.

A method that is becoming increasingly important for production of shaped articles is the additive manufacturing method (3D printing method), which comprises numerous different techniques having the common factor of automated additive layer buildup of the shaped article (A. Gebhardt, Generative Fertigungsverfahren [Additive Manufacturing Methods], Carl Hanser Verlag, Munich 2013). A prerequisite for all additive manufacturing methods is the representation of the geometry and of any further properties (colour, material composition) of the desired shaped article in the form of a digital 3D dataset which can be regarded as a virtual model of the shaped article. This modelling is preferably effected by means of various 3D-CAD (computer-aided design) construction methods. Input data that can be used for the creation of a 3D-CAD model may also be 3D measurement data as result, for example, from CT (computer tomography) measurements or MRT (magnetic resonance tomography) measurements. The 3D-CAD dataset subsequently has to be supplemented by material-, process- and system-specific data, which is effected by exporting them to an additive manufacturing software package in a suitable format (e.g. STL, CLI/SLC, PLY, VRML, AMF format) via an interface. This software ultimately generates virtual slices from the geometric information, taking account of the optimal orientation of the component in the construction space, support structures etc. The complete dataset ultimately allows the direct actuation of the machine used for the additive manufacturing (3D printer).

The software procedure is, for example, as follows:
1. Construction of the component in CAD format
2. Export into the STL data format
3. Division of the 3D model into layers parallel to the printing plane and generation of the GCode
4. Transmission of the GCode to the print controller Additive manufacturing methods are available for numerous materials and combinations thereof (e.g. metals, plastics, ceramics, glasses). For example, for the additive manufacturing of workpieces, there already exist multiple established methods such as fused deposition modelling (FDM) for plastics and specific synthetic resins
stereolithography for liquid synthetic resins
laser sintering for metals, polymers and ceramic
electron beam melting for metals In the case of FDM printing, a solid plastic is melted by means of an extruder and the workpiece is built up in sheets. An example of instruments of this class is the German Reprap NEO.

In the case of stereolithography, a liquid synthetic resin is hardened layer by layer by means of a laser. One example of printers of this design is the ProJet series from the manufacturer 3DSystems. Laser sintering and electron beam fusion work by a similar principle. In both methods, a material in powder form is fused layer by layer and hence the workpiece is built up. The difference is merely how the material is fused, by means of laser or electron beam.

WO 2015/059502 A1 describes a method for producing silicone parts proceeding from a bath of silicone base material. In this bath, a second component which is applied point by point by means of a needle-shaped nozzle allows the silicone-based material to cure in a localized manner. The movement of the nozzle is controlled in three-dimensional space by means of CAD data. After completion of the print, the generated element is removed from the bath and freed of as yet uncured base material. Disadvantages of the method are the low print speeds and the subsequent cleaning of the printed component to remove adhering uncrosslinked print material, which is time-consuming. DE 20 2013 011 396 U1 describes an additive device which applies the principle of electrophotography. This involves applying charged particles/liquids with an image carrier roll layer by layer to a shaped article. The solidification or curing of the layers is achieved by thermal fusion or UV light crosslinking. Undercuts or self-supporting layers become possible through insertion of separate regions with support material. This method is not implementable for silicones.

DE 20 2016 000 367 U1 describes the production and the construction of a composite press pad for hydraulic multilevel presses. In this case, pad layers of silicone are applied by a metallic support weave by a 3D printing method. In the production method, crosslinking platinum-catalysed silicones are cited, which are crosslinked or fully vulcanized with UV light. The UV light sources are described here as being executed similarly to the print head.

GB 2508204 A describes a method of creating a body-fitted shoe insole. This involves using scanned 3D data from the foot to create an optimal shape. Additionally mentioned are printing with various silicones of different hardness, and design with variable hard zones. Likewise described are strategies by which the outward ductility can be varied by means of different geometric shapes. What is especially noteworthy is the use of silicone printing. The use of silicone as a printing material requires additional extensions or technical modifications.

WO 2015/107333 describes a device and a method for printing silicone elastomer articles. In this case, by means of various nozzles, a multicomponent silicone is mixed in a mixer chamber integrated into a 3D printer and a strand is used to additively manufacture a shaped article.

The processes known in the prior art relate merely to the production of shaped silicone articles, but not to improved print accuracy and more precise deposition of the print material by compensation and avoidance of unwanted effects during the 3D printing of shaped silicone articles.

In silicone 3D printing, the print material can be deposited on the shaped article as it forms, for example, by means of droplet dosage (called jetting) or by means of continuous extrusion of a strand (in what is called the dispensing method). It is possible to use different types of silicone elastomers. A more detailed description of a 3D silicone printing method by means of droplet dosage is specified in WO 2016/071241 A1.

In the two dosage processes mentioned in 3D printing/additive manufacturing for deposition of silicone print materials, unwanted effects can occur as a result of electrostatic charging both in jetting dosage methods and in dispensed dosage methods. With increasing shear energy input during the dosage, there is an increase in this triboelectric effect. During the dosage operation, the print material and hence also already deposited print bodies become charged in the dosage process owing to the triboelectricity. This electrostatic charging becomes perceptible in particular in jetting processes with high throughputs.

The triboelectric effect leads to electrostatic charging of the print material and the component. It likewise occurs to an enhanced degree in dispensing processes over and above print material throughputs of greater than 10 g/h, to an enhanced degree over and above 30 g/h, and to an especially enhanced degree over and above 50 g/h. In dispensing processes, the effect of the electrostatic charging is that the application of the extruded print material onto the deposited shaped article becomes irregular. Linear application of the print material in a straight direction is then impossible and leads to wavy lines and lateral wandering of the print material freshly deposited on the shaped article surface.

Without being bound by theory, a possible physical explanation for the triboelectric effect is as follows:

The shear or mass movements in the liquid print material in the nozzle result in separation of charges, and every expelled droplet or strand bears a certain unknown electrical charge. The droplets or the strand hit the print body, which again results in separation of charge. The shaped article built up layer by layer behaves in a comparable manner to a series of charged plates and becomes charged to very high electrical potentials, in a comparable manner to a layer capacitor.

The charging gives rise to an electrical field emanating from the deposited shaped article. This electrical field leads to an electromagnetic force on the droplets or strands that exit from the dosage nozzle and are deposited onto the shaped article. The relaxation characteristics (flow characteristics/diffluence characteristics) of the freshly dosed uncrosslinked silicone print material of fluid viscosity are affected and/or it is partly deformed.

In the context of this invention, "relaxation" is understood to mean the diffluence of the silicone materials deposited prior to curing. The "relaxation time", or the time often called "relaxation time constant" in the literature, describes the characteristic time within which positioned print materials diffuse and/or merge into one another until they reach a steady state.

This is manifested particularly at the outside boundaries of such a shaped article. At the edges of such charged shaped articles, the characteristic excess field increases result in formation of silicone threads moving away from the shaped article, which protrude outward from the shaped article and are comparable to a "hedgehog structure". Print droplets or strands present in the air are affected by electrical fields present and/or are deflected from their flight path (trajectory) or in their laying pathway by repulsion of the like electrical charge. The extent of this can be such that print droplets released are positioned up to a few cm away from the desired position and print strands move in a diffuse and uncontrolled manner beneath the print nozzle in a similar manner to a moving "lasso". In addition, small charged portions of the droplets, called satellite droplets, or portions of the strands, and also small amounts of silicone that are splashed up when the droplets hit, are deflected by the electrical field or charge repulsion and moved away from the shaped article. This is manifested as a mist of particles alongside the shaped article or as an unclean print. Moreover, this can lead in the extreme case to sticking of the jetting print nozzle and hence to an interruption of the print operation.

These electrostatic effects that occur become ever more significant with increasing throughputs at the dosage nozzles and cause deposition errors in the print materials dosed. In the jetting method, a growing dosage throughput is equivalent to an increasing jetting frequency. These effects accordingly cause considerable trajectory errors (incorrect flight paths) of the dosed droplets before they are deposited on the shaped article. In the dispensing method, the electrostatic effects cause an increasingly imprecise and irregular laying pathway of the deposited strands with increasing throughput, and hence deformation of the print bodies generated.

In the dispensing method, as a result of the process, there are regular stops and interruptions of the continuous print material strand dosage at corners and edges of the deposited shaped article.

At those points in particular, electrostatic charges cause outward spraying and irregular breakoff of the print material strand, which leads to trapping of air, to bulge-like elevations and to formation of runs on the shaped article.

In addition, there is an adverse effect on the relaxation characteristics (intermerging) of the silicone material droplets or strands deposited on the shaped article surface with one another and/or on the flow characteristics of the silicone print material at interfaces to extrinsic components. Local charges on settled print materials and at interfaces, by virtue of the fields that occur and/or by virtue of repulsion of like charges, affect the flow and diffluence characteristics of settled uncured print materials. In this case, the uncured print material volumes relax (flow) incompletely or inadequately as a result of the repulsion of charge and/or move away from one another and hence deform the shaped article. This is manifested by running of the edge regions and can lead to the formation of local defects (caverns, air bubbles). Furthermore, with increasing dosage throughput, the surface charges that occur cause the surface quality achievable to become ever more inadequate. The result is highly structured surfaces which do not level out even after prolonged relaxation time (flow time/diffluence time). The effect of relaxation time of the settled materials is given by $$\tau_{\mathit{eff}} = \tau_s + \tau_{io} - \tau_{\mathit{virb}}.$$

In this formula, $\tau_{\mathit{eff}}$ is the effective relaxation time, $\tau_s$ is the self-relaxation time of the print droplet/the print material strand without any electrostatic or mechanical influence, $\tau_{io}$ is the extension of the relaxation time owing to the electrostatic charging, $\tau_{\mathit{vibr}}$ is the reduction in the relaxation time owing to the effect of mechanical vibrations.

The change in shape of the print droplet/print material strand can be given by $$u(t) = u + (u_0 - u)\exp(-t/\tau_{\mathit{eff}}).$$

In this formula, u(t) is the time-dependent shape of the positioned print droplet/the print material strand, u is the fully relaxed shape of the print droplet/the print material strand, $u_0$ is the shape of the print droplet immediately after settling, t is the time after settling of the print droplet/the print material strand, $\tau_{\mathit{eff}}$ is the effective relaxation time, exp( . . . ) is the e function (natural exponential function).

The localized charges and the high electrical insulation properties of silicone materials result in very large values for $\tau_{io}$, for example in the range from a few hours to days. An industrially suitable, economically viable and simultaneously form-fitting 3D printing method requires high dosage throughputs and rapid 3D printing speeds. Additive manufacturing or 3D printing with crosslinkable liquid silicone print materials or 3D printing methods with silicones and other 3D-printed materials is made more difficult and becomes virtually unimplementable as a result of the above-mentioned electrostatic effects.

The cause lies in the intrinsic high propensity of silicones to electrostatic charging through friction. The electrical properties of uncrosslinked and crosslinked silicones are not fundamentally different. This phenomenon is also called the "triboelectric effect". This is an effect that has long been known from the literature in polymers. Silicones and 3D print materials produced therefrom are very prone to this. Silicones are at the negative end of what is called the triboelectric series as described, for example, in the Masters thesis by Deanna M. Jacobs, entitled "*Electrostatic discharge—understanding and controlling the phenomenon: A handbook for packaging professionals*" on page 21.

Processes and devices for ionization or for affecting the flight path (trajectory) of particles are known in principle in other technical fields, for example in inkjet printers ("continuous inkjet method") or spray devices, but are used to solve different technical problems therein compared to the present invention.

DE 698 08 104 T2 describes an inkjet printing method in which the electrical charging of the droplets dosed is technically required and necessary for the method desired. This is a system for controlling and expelling electrically conductive liquid. The liquid, or the inkjet, is fractionated therein by electrostatic forces into droplets of the desired size. Moreover, the print droplets are electrically charged and later in turn deflected by electrical fields, and the movement paths of the droplets are influenced in a controlled manner.

DE 689 10 459 T2 describes various extensions of an electrostatic inkjet printing device. Print parameters of the droplets are determined here during printing in order to compensate for variations in the ink. Also cited are devices for fractionation and for electrostatic charging of the ink droplets.

DE 10 2005 000 983 A1 describes an ionization attachment for a spray device. In this case, droplets or solid particles moved by compressed air are ionized and hence moved in a more selective manner toward a target having the opposite potential. The electrostatic forces draw the particles or droplets toward the target and minimize spray losses.

None of these above-described methods is technically implementable for the 3D printing of crosslinkable silicone print materials. Furthermore, none of these methods has been used to date for improvement of the print quality of 3D shaped articles.

Furthermore, in the dosage methods described above, only low-viscosity print materials in the viscosity range of not more than 50 mPa·s are used. These methods are unsuitable for silicone print materials of higher viscosity (exceeding 100,000 mPa·s), as described by way of example in WO 16071241.

The problem addressed by the present invention was therefore that of providing an additive 3D printing method for silicone elastomer mouldings which leads to a high-quality print with minimum print times combined with high throughputs. More particularly, the intention was to ensure that the print materials can be positioned at the intended target position without trajectory errors.

SUMMARY OF THE INVENTION

This and other problems are surprisingly solved by the method according to the invention and the device according to the inventionwhich enables the printing of shaped silicone elastomer articles with high throughput and significantly elevated and uniform print quality. The method involves causing the print material, after leaving the nozzle, to traverse a discharge region generated by an ionization system.

DETAILED DESCRIPTION OF THE PREFERRED EMBODIMENTS

Figure 1:
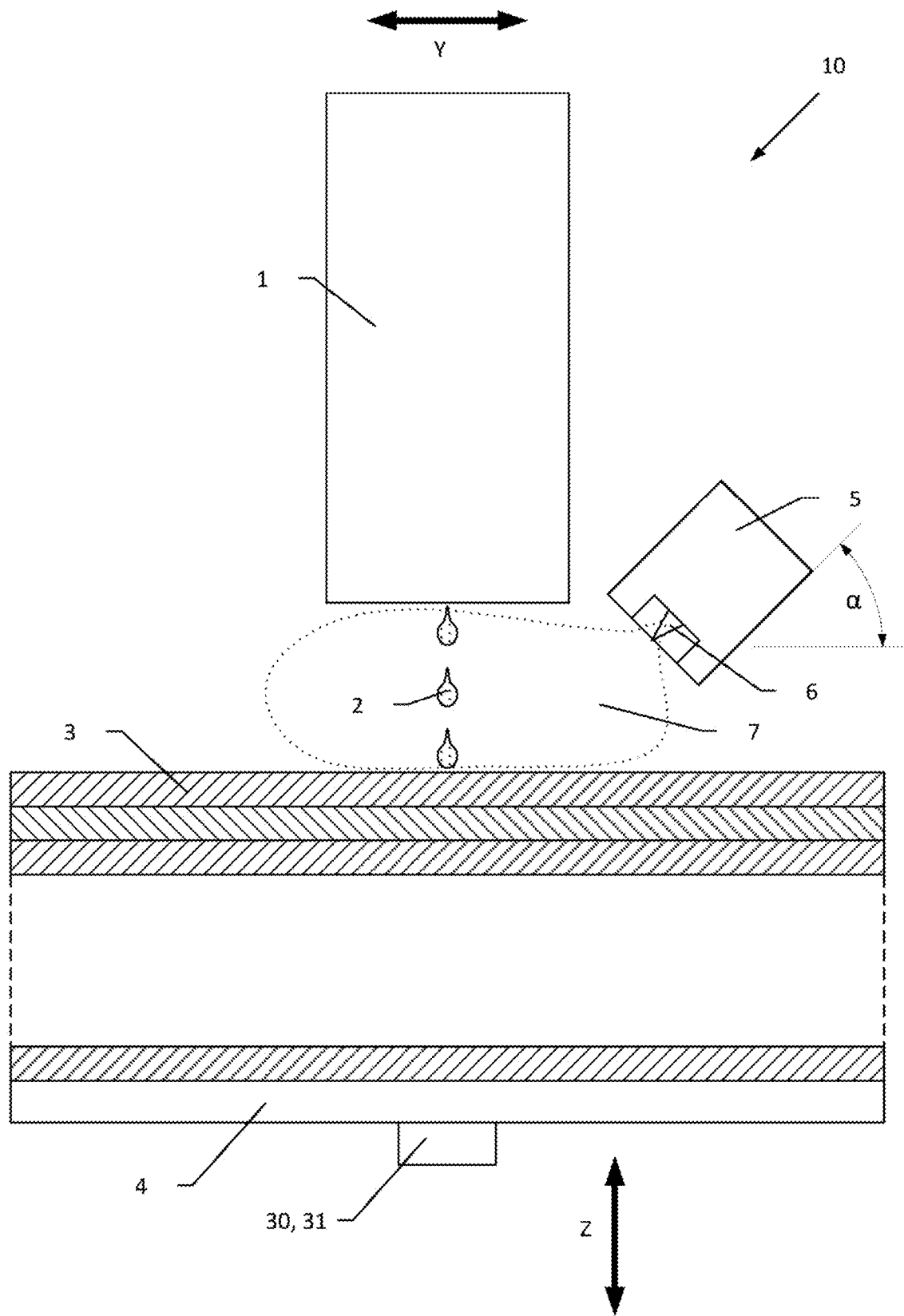
FIG. 1 shows a diagram of the side view of a manufacturing system according to the invention with a longitudinal ionization electrode.

The invention relates to a method for layer-by-layer production of shaped silicone elastomer articles comprising the following steps:

1) By means of a spatially independently controllable 3D printing device, in an x,y working plane, two or more print materials are applied in the form of droplets or continuous strands via one or more print nozzles to a spatially independently controllable carrier plate, to an extrinsic component positioned thereon or to a print material layer applied beforehand, wherein at least one of the print materials comprises a silicone elastomer curable by electromagnetic radiation;

2) By means of at least one spatially independently controllable source of electromagnetic radiation, the print materials applied are crosslinked or partly crosslinked, so as to form a layer of the cured or partly cured shaped silicone elastomer article;

3) The print nozzle of the 3D printing device or the carrier plate are moved in the z direction in a defined manner, such that the next print material layer can be applied in the x,y working plane;

4) Steps 1) to 3) are repeated until the shaped silicone elastomer article is fully constructed, wherein steps 1), 2) and 3) are effected independently of one another or coupled to one another simultaneously or successively in any sequence, characterized in that the print materials after leaving the print nozzle traverse a discharge region generated by means of an ionization system.

Preferably, the silicone elastomer used in the method according to the invention is an addition-crosslinking silicone rubber compound. In step 2), this can be crosslinked either thermally and/or by means of UV or UV-VIS light. Silicone rubber compounds of this kind are known, for example, from WO 2016/071241 A1 and in the publications cited therein.

Preferably, the print materials have a viscosity at 25° C. and at a shear rate of 0.5 $s^{-1}$ of at least 40 Pa·s, more preferably at least 100 Pa·s and most preferably at least 200 Pa·s.

The print materials are preferably deposited at mass throughputs of more than 5 g/h, more preferably at mass throughputs of more than 10 g/h, and especially at mass throughputs of more than 20 g/h.

The viscosity of the silicone rubber compounds can be determined, for example, by means of the test method described hereinafter: using an "MCR 302" rheometer from Anton Paar; Graz, Austria according to DIN EN ISO 3219: 1994 and DIN 53019, using a cone-plate system (CP50-2 cone) with an opening angle of 2°. The instrument is calibrated with 10000 standard oil from the National Metrology Institute of Germany, Brunswick, Germany. The measurement temperature is 25.00° C.+/−0.05° C., the measurement time 3 min. The viscosity figure is the arithmetic mean of three independently conducted individual measurements. The measurement uncertainty in the dynamic viscosity is 1.5%.

Preferably, the method according to the invention is characterized in that, in addition to the silicone elastomer print material, a second print material removable after completion of the shaped silicone elastomer article is applied as a support material. In this context, any desired known support material is usable.

The action of the electromagnetic radiation on the print materials is preferably location-selective or over the full area, pulsed or continuous, and with constant or variable intensity.

In addition, the method according to the invention is preferably characterized in that the discharge region covers part or all of the surface of the carrier plate, of the extrinsic component or of a previously applied print material layer. More particularly, it is advantageous when, in addition to the charging of the print material, charges over the entire print region and/or external bodies or extrinsic components are neutralized. For example, for this purpose, an active ionization electrode, before the printing, can be moved across the print region and also over external bodies and extrinsic components.

The method according to the invention is further preferably characterized in that a controlled gas flow of ionizable gas is generated proceeding from the ionization system in the direction of the discharge region. Preferably, the ionizable gas is compressed air, but other gases or gas mixtures are also usable, such as nitrogen or lean air (i.e. nitrogen-enriched air). The gas flow can generate a directed and better-defined discharge region. Furthermore, a dust removal effect, i.e. reduction in the particle input, is possible. This is of particular relevance for shaped articles that require cleanroom conditions, for example medical articles.

The method according to the invention is further preferably characterized in that the outer boundaries of the shaped silicone elastomer article are printed first and then the outlined interior is filled completely or partly with print material.

The print material applied is preferably subjected fully or partly to mechanical vibration prior to crosslinking or partial crosslinking. Preferably, there is at least one extraneous component here within the outlined interior. The extraneous component can be imprinted into the shaped silicone elastomer article in a form-fitting manner by this method.

Preferably, during the printing, the mechanical motions/vibrations present in the carrier plate and the print body are measured and evaluated.

Above a permissible tolerance range, for example, messages can be generated and/or the print operation can be terminated. This can also be used as a safety measure in order to recognize any mechanical encroachment of personnel onto the carrier plate in the print region.

In addition, the present invention relates to a manufacturing system for use in the method described above, wherein the manufacturing system comprises at least the following components:

- a spatially independently controllable 3D printer device comprising one or more reservoirs for one or more print materials and at least one print head comprising one or more print nozzles,
- a spatially independently controllable source of electromagnetic radiation,
- a spatially independently controllable carrier plate and
- an ionization system for generation of a discharge region in the region between print nozzles and the carrier plate.

Suitable print nozzles for silicone printing are manufactured by companies such as "NORDSON CORP./USA" and "VERMES MICRODISPENSING GMBH/Germany"). These print nozzles enable pressure buildup within the kbar range, which means that amounts of liquid in the pl to nl range can be expelled within 1-100 μs through a nozzle having diameters between 50 and 500 μm at a speed of 1-100 m/s. This operation is repeated with a frequency of up to several hundred Hz (these are typical parameter ranges which can differ considerably in the individual case).

Both the 3D printer device and the source of electromagnetic radiation, and also the carrier plate are spatially independently controllable.

In the context of the present invention, "spatially independently controllable" means that the corresponding device can be moved in all three spatial directions x, y and z, i.e. three-dimensional, in a location-selective manner.

The manufacturing system according to the invention is preferably characterized in that the ionization system comprises one or more spatially independently controllable ionization electrodes.

Preferably, the inclination of the ionization electrode can be adjusted in a location-sensitive manner. This allows the edges to be optimally covered and discharged by the electrodes in comparatively large components.

Suitable ionization systems are obtainable, for example, from the company "Haug Ionisationssysteme GmbH & Co. KG/Germany". A system of this kind is typically divided into a discharge power supply and a discharge device, also called an ionization electrode. The discharge power supply transforms the mains voltage available (120/230 V) to a high voltage of up to a few thousand volts. The ionization electrode may assume several forms. Examples that should be mentioned here include elongated rods, annular or ionization electrodes in the form of manual devices. All ionization electrodes have metallic parts (for example tips) which are put under the high voltage and at which the surrounding gas molecules are charged in accordance with the voltage applied.

A specific example of a suitable ionization electrode unit for avoidance of electrostatic charges is a device system from Haug, consisting of a power supply (Haug EN SL LC 230V/50-60 Hz universal power supply with accompanying mains cable) and one or two electrically connected Haug ionization rods (ionization electrodes) from the VS series (e.g. VS 028 300 ionization rod).

The present invention is not restricted to the electrode types described. Also usable are ionization systems and/or ionization electrodes based on other constructions and systems from other manufacturers.

The electrode(s) is/are mounted in the printing device as described in the figures, such that they deionize the region around the nozzle exit for the print material.

The manufacturing system according to the invention is further preferably characterized in that the ionization system has at least one gas connection for an ionizable gas and at least one gas nozzle directed toward the discharge region.

The at least one ionization electrode is preferably arranged in a laterally inclined manner with respect to the print head, so as to cover the full area of the region between the print nozzles and carrier plate. Alternatively, the ionization electrode may be arranged in the form of a ring beneath each print nozzle, in order thus to cover the region beneath each individual print nozzle.

The angle of inclination α (angle between the plane of the carrier plate and the transverse axis of the ionization electrode) with ionization systems mounted laterally is preferably in the range from 10° to 80°, more preferably in the range from 20° to 60°, and especially in the range from 25° to 35°.

In addition, the distance between the tip of the ionization electrode and the tip of the nozzle is preferably in a range below 10 cm, more preferably below 5 cm, and especially below 3 cm.

The ionization electrode is independently controllable in spatial terms and preferably in terms of inclination, such that not just the print materials but preferably also the carrier plate and any extrinsic components can be neutralized.

The ionization electrode may be mounted in the vicinity of the metering device; it may optionally also address the entire construction space independently of the metering device, such that any desired point in the construction space can be deionized.

The manufacturing system of the invention preferably further comprises at least one vibration generator. The vibration generator is preferably integrated into at least one holder in the carrier plate. The vibration generator is preferably set up such that vibrations of any desired mechanical amplitudes and frequencies can be generated.

In addition, the manufacturing system according to the invention is preferably characterized in that the 3D printing device comprises at least one confocal measurement system having one or more confocal lenses. Preferably, the confocal lenses and the print nozzles are mounted together on a carriage of a linear actuator and in their entirety form the print head of the 3D printing device.

In addition, the manufacturing system according to the invention is preferably characterized in that it has at least one control unit in which measurement signals obtained by the confocal system can be evaluated and processed further. As described above, it is possible in this way, for example, to measure and, if necessary, further process vibrations and movements of the carrier plate or of the print body.

Preferably, there are one or more positioning geometries for positioning of at least one extrinsic component mounted in the manufacturing system according to the invention, on the carrier plate or onto a previously applied and crosslinked print material layer. These positioning geometries are preferably spacers or positioning points which are attached or mounted on the carrier plate itself or have been produced therefrom by prior printing.

The 3D printing device preferably comprises a movement system for the x,y working plane, wherein the movement system comprises a movement axis movable in the y direction, a movement axis movable in the x direction and a positioning unit. Preferably, there is a holder for the ionization system and the source of electromagnetic radiation mounted on the movement axis movable in x direction.

The present invention further relates to a shaped silicone elastomer article which has been produced by the method described above. Preferably, there is at least one extrinsic component embedded fully or partly, in a form-fitting manner, into this shaped silicone elastomer article.

The shaped silicone elastomer articles according to the invention feature elevated print quality, smooth edges and low deformation. Extrinsic components, even having difficult and poorly accessible surface structures, can be optimally embedded and enclosed in a form-fitting manner.

Moreover, the shaped silicone elastomer articles show a high quality of accordance with the CAD model and improved position and evenness tolerances of the edge faces compared to the CAD model. In addition, better surface roughness is possible (e.g. a mean roughness: $R_A$<100 μm). Surface roughness can be determined, for example, by test methods according to DIN ISO 25178-1:2016-04 and DIN EN ISO 25178-2:2012-09.

The figures show working examples of the invention, although these merely schematically illustrate the subject-matter of the invention. The working examples shown and described hereinafter with reference to the figures should not be regarded as being restrictive of the subject-matter of the invention. A multitude of modifications that are possible within the scope of the claims will be apparent to the person skilled in the art.

FIG. 1 shows the construction of a manufacturing system according to the invention. In side view (10), any desired shaped silicone elastomer article is built up layer by layer on a carrier plate (4). This carrier plate is borne by a holder (30). The layers (3) of the shaped article, in accordance with the curing strategy, are cured immediately after the printing of the respective layer or after the printing of the nth layer. The curing is effected by means of electromagnetic radiation (UV, IR, etc.). To the side of the print nozzle (1), inclined by the angle α from the plane of the carrier plate, a high-voltage electrode (5) forms an ionization region (discharge region) (7). The high-voltage electrode together with a corresponding voltage supply forms the ionization system, which is sufficiently well-known in the prior art. Immediately after leaving the print nozzle (1), the print material (2) in the form of print droplets or as a print strand passes through the discharge region (7) which is generated by the high-voltage electrode (5). In the discharge region (7), adhering charges are electrically neutralized by ionized gas, for example air. The neutralization preferably includes the impact region of the print material. The print body is consequently not charged and remains electrically neutral. For further improvement of the charge neutralization, there is preferably also a controlled gas flow provided in the ionization system, which flows around the tips (6) of the high-voltage electrode (5) in the direction of the print nozzle (1). This can be achieved, for example, with a gas connection (for example pressurized gas or any other ionizable gas) and a directed nozzle at the ionization electrode (5). The gas flowing past is ionized and then neutralizes the charges bound in the print material on the layers (3) or in flight. The flow can generate a directed and better-defined discharge region (7).

Figure 2:
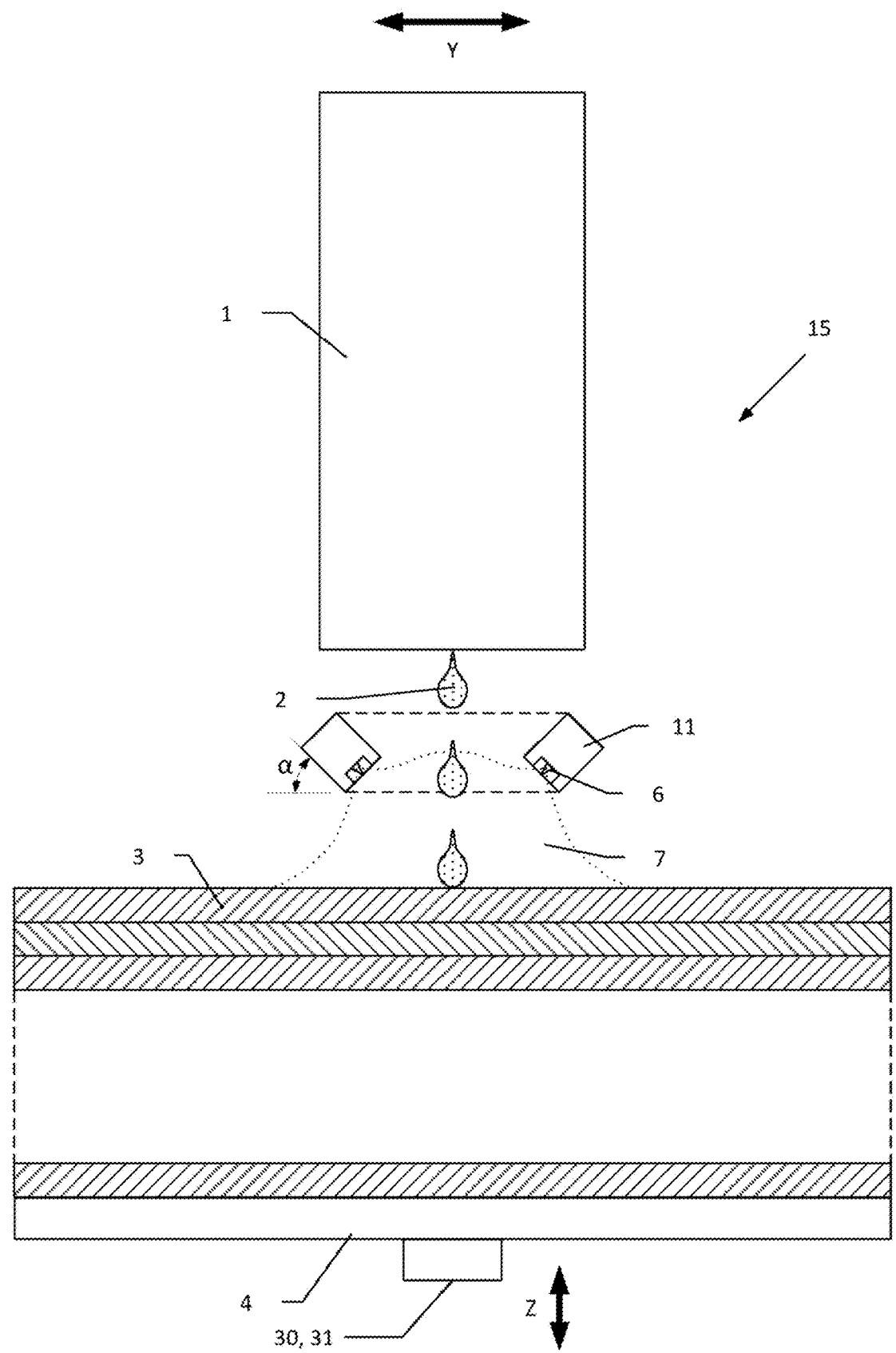
FIG. 2 shows a diagram of the side view of a manufacturing system according to the invention with an annular ionization electrode.

A further embodiment is depicted in FIG. 2. The same details as have already been described above for FIG. 1 are applicable to FIG. 2. In a departure from the embodiment depicted in FIG. 1, the side view (15) of FIG. 2 shows an annular high-voltage electrode (11) which is arranged beneath the print nozzle (1) and through which the jet of the print material (2) is conducted. Charged print droplets or strands are discharged as they pass through the centre of the ring and hit the shaped article and the uppermost of the layers (3) in the discharge region (7). Charges that form and already exist on the shaped article and the layers (3) are immediately neutralized. A directed gas flow which flows around the tips (6) of the high-voltage electrode ensures a locally defined discharge region (7).

In the case of specific printing processes, print layers and/or shaped articles are generated atop, on (application printing) or surrounding (embedding printing) existing bodies. If these existing/external bodies (extrinsic components) can be electrostatically charged, deflections of the print droplets or strands may arise owing to the abovementioned electrostatic effects. In order to rule this out, prior to the application printing and embedding printing, the ionization electrode as a whole is moved across the entire print region and the external bodies in order to neutralize any existing charges. The magnitude and duration of the discharge prior to the printing are dependent on the size and the physical properties of the surface to be covered.

Figure 3:
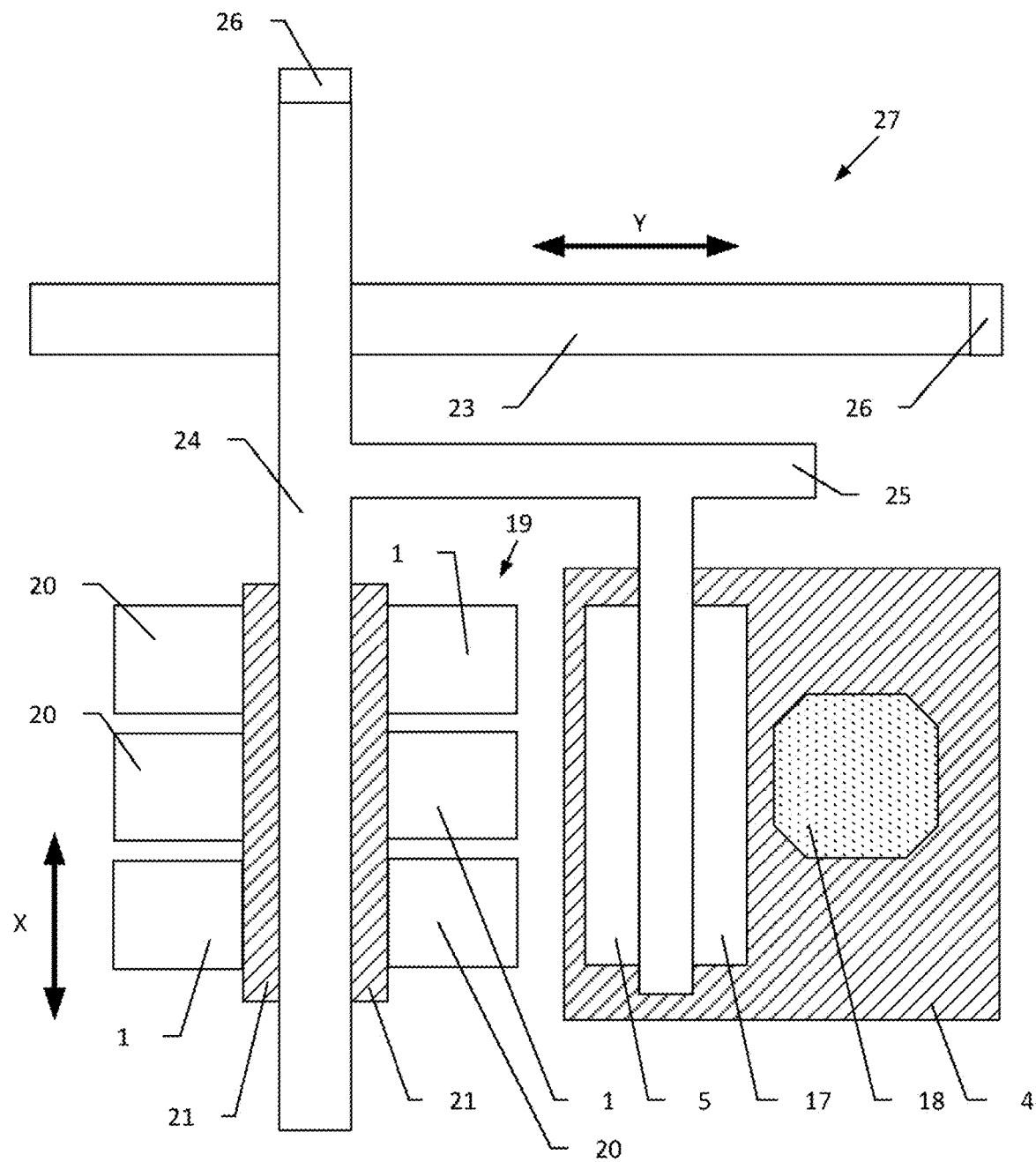
FIG. 3 shows a diagram of the top view of a manufacturing system according to the invention with a longitudinal ionization electrode.

FIG. 3 shows a top view (27) of a manufacturing system. In this case, a print head (19) is arranged so as to be movable in x direction on an x movement axis (24). The two axes (23, 24) together with the positioning units (26) form a regulated movement system for the x-y plane. Various print nozzles (1) or lenses (20) of a confocal measurement system are mounted on the carrier plates (21) of the print head (19). Also mounted rigidly on the x movement axis (24) is a holder (25) which bears a high-voltage electrode (5) and a UV light source (17). By moving in the y movement axis (23), it is possible to discharge an external component or created shaped article (18) on the carrier plate (4). In this case, the high-voltage electrode (5) traverses the complete body (18) with its ionization region.

The setup and the procedure described in accordance with FIG. 3 is extremely important in the case of application printing on highly chargeable extrinsic components. Particular mention should be made here of silicone elastomers having high permittivity, called electroactive polymers (EAP). These specific silicone elastomers can be utilized by means of applied electrical fields to generate controlled movements. A thin silicone film is provided here with a conductive cathode and anode on its surfaces. The system setup is similar to that of a capacitor. The electrostatic forces result in compression of the silicone film, and it receives a mechanical movement in lateral direction. By controlled utilization of this movement, it is possible to create actuators. This effect can also be utilized in reverse, and can be used for energy recovery or for sensor technology. The modes of construction for such systems are sufficiently well-known here to the person skilled in the art. In certain sectors, combinations with 3D-printed components are employable. Examples include vessel implants with a pump effect, hearing aids, active lenses, active spectacles (seeing aids), active massage orthoses (lymph drainage), active prostheses, body-supporting orthoses with assistance of movement (difficulty in walking etc.), integrated sensors in prostheses and orthoses, pump dosage of high-purity substances, etc.

Moreover, the bonding of ultrathin silicone films to printed support skeletons or the direct integration of such films as a permeable membrane is employable. Examples here include storage for blood (blood bags), wound dressings for burns with a printed support skeleton (facemask, body moulding, etc.) and wound dressings with a support skeleton in combination with cold plasma (plasma disinfection).

As already described in the paragraphs above, externally added articles, especially silicone articles, become electrostatically charged. This effect is observed to an enhanced degree in the case of electroactive polymers (EAP) or ultrathin silicone films. It is thus necessary here, prior to the positioning of the external silicone articles, to run the ionization electrode across the entire working region and to neutralize the external EAP or silicone articles beforehand. This can be effected with the ionization system installed in the printer according to the invention.

In 3D printing with silicone elastomers, bonding and intermerging and/or complete wetting of edge layers or extrinsic components is extremely important. Especially in the case of printing of relatively large components, specific printing strategies can reduce the printing time. In this case, however, there is increased occurrence of edge layers which have to be embedded in a form-fitting manner. However, the viscosity of silicone elastomers is not always optimal for rapid and reliable wetting or relaxation (self-levelling/diffluence). In the case of printing on extrinsic components, conventional printing (jetting, dispensing) on surfaces with undercuts (pores, very rough surfaces, holes, etc.) is in some cases problematic and inadequate. Shadowed recesses, vertical textured edges and undercuts cannot, as required for construction purposes, be filled up by droplets or strands coming in from above. Instead, the silicone elastomer here has to relax (flow) from the side to the material edge and wet it. This is in some cases associated only with a considerable wait time or unacceptable idle times for the printer. Large relaxation volumes or long relaxation pathways cause long self-relaxation times $\tau_s$. Even when the body and/or the print materials have been charged, adequate wetting is prevented (very large $\tau_{eff}$ as a result of very large $\tau_{io}$). Various printing methods and extensions are described hereinafter in order to compensate for this.

Figure 5:
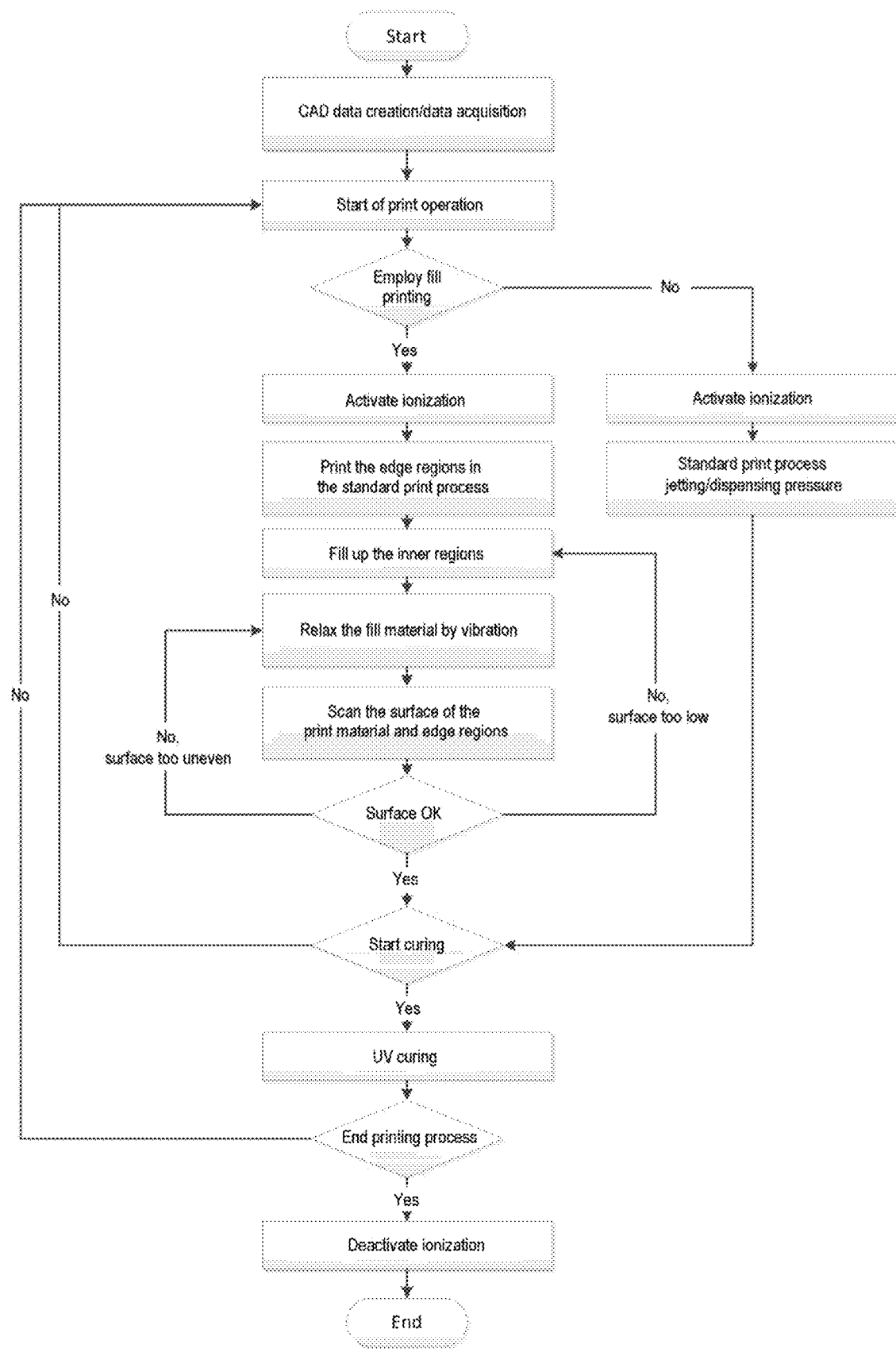
FIG. 5 shows the illustrative flow diagram of a printing process according to the invention.

Fill printing method and vibration relaxation:

A specific embodiment of the 3D printing method according to the invention is the fill printing method. This generates relatively large bodies in a combination of multiple printing strategies and methods. In this method, the outside boundaries are printed by the normal jetting or dispensing method and the hollow interior is subsequently filled. The filling is effected by a movement strategy similar to the dispensing method. The interior is filled strand by strand or point by point from any desired points. In the filling and the filling strategy, adequate wetting of the wall regions has to be ensured. This is of significance especially in the case of printing strand by strand. Large strands (diameter>1 mm) or large droplets (diameter>1 mm) with high viscosity can result in formation of material fronts that cause trapping of air at edge regions (solid/filling material transition). Moreover, the relaxation requires a certain period of time. It would be possible to shorten this with decreasing viscosity of the print material, but this has the disadvantage that voxels placed with the same mass are more rapidly deformed and diffuse at edge regions. One way of influencing the effects mentioned above in a positive manner is to subject the print body to mechanical vibration (reduction of $\tau_{eff}$ by $\tau_{vibr}$). The vibrations ensure faster levelling and, given an optimized filling strategy, lead to optimal wetting of the edge regions. Preference is given here to using piezo elements, compressed air vibrators or vibration motors for generating the vibration. Examples include standard vibration generators in the ultrasound region. For example, the mechanical vibration can be transmitted to the carrier plate (4) by means of a vibration generator (31) integrated within the holder (30). FIG. 5 shows a process sequence of 3D printing comprising ionization, fill printing and relaxation. A further application of vibration relaxation is printing on support materials. In the case of support materials, setting or laying of print materials thereon with high jetting frequency or with high kinetic energies can lead to deformation of the load-bearing support material surface. This in turn leads to unwanted roughness or structuring of the side of the print material facing the support materials. As a result of vibration relaxation, an incompressible support material with an uncured print material layer beneath levels out on its own accord and forms a more even and smoother phase boundary.

Figure 4:
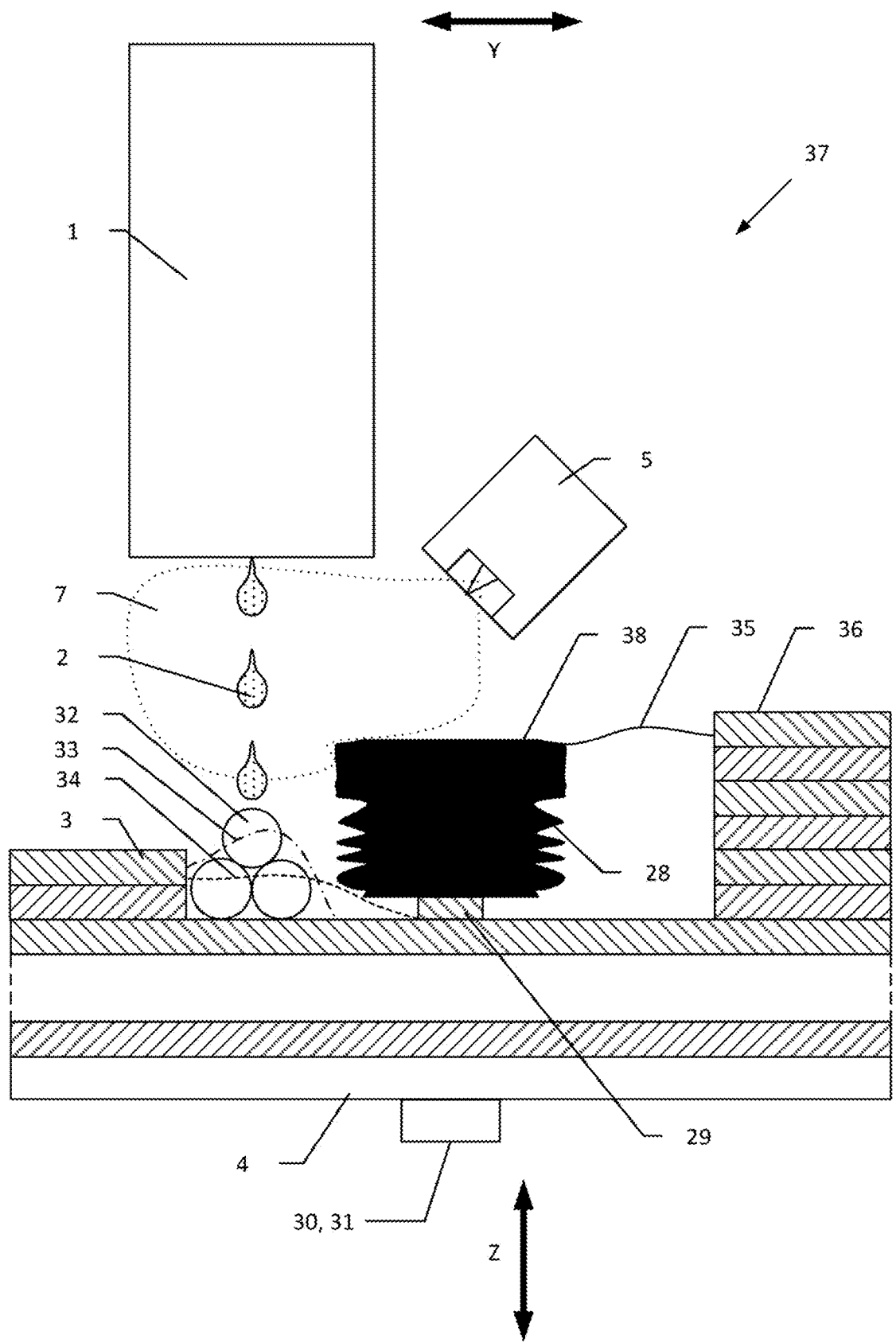
FIG. 4 shows a diagram of the side view of a manufacturing system according to the invention during operation according to the edge-filling method on extrinsic components.

Edge filling method:

By the edge filling method, it is possible to fully wet and imprint an extrinsic component over its full area. FIG. 4 shows this edge filling method in a side view (37). In this case, print droplets or print strands (2) from the print nozzle (1) are deposited alongside an extrinsic component (38) in a fixed pattern. The print materials (2) released, existing print layers (3) and extrinsic components (38) are electrically neutralized by the high-voltage electrode (5). According to the component geometry and requirements, extrinsic components are placed at positioning geometries (29). This positioning geometry (29) can be used for centring or fixing and/or as spacers. The print materials (32) deposited are relaxed by mechanical vibrations and form material fronts in accordance with the line (33) and (34). This fills the area around the extrinsic component, with full wetting, by flowing silicone from the side. Regions that are not printable from the side, such as the abovementioned undercuts or textured surfaces, are optimally bonded to the silicone elastomers by the rising filling from the surrounding edge. Complete electrical neutralization of the extrinsic component (38) with the edge faces (28) and the print materials (2) by the high-voltage electrode (5) is extremely important here. In the case of local charging at the side faces and/or of deposited print materials (32), the desired relaxation of the print materials (32) to the edge (28) of the extrinsic component (38) is hindered and air inclusions can form. The ionization region (7) must consequently cover all edge regions (28) of the extrinsic component (38) and permanently surround the print materials (2). The curing of the positioned and relaxed print materials is again undertaken by means of radiation in accordance with the desired curing strategy. The mechanical vibrations can be transmitted into the carrier plate (4) by vibration generators (31) integrated into the holder of the carrier plate (30). By confocal height measurement, the material fronts (33), (34) and (35) can be measured and the print material still required for an even front (surface) can be calculated. Finally, the uppermost printed front (36) is taken as a reference plane and the necessary filling volume is calculated for the front (36) and the top end of the component, and the print material still required is positioned in terms of amount and location according to appropriate schemes.

The following advantages of the invention are apparent over the prior art:

(1) compensation of electrostatic effects in 3D printing with silicone elastomers (2) deionizing of extrinsic components before and during 3D printing (3) combination of discharge (ionization) and UV curing in one step (4) incorporation of vibrations for quicker and defined and complete relaxation of the print materials (5) imprinting of chargeable or nonchargeable components with undercuts and/or textured surfaces with the aid of the fill printing method, especially with the aid of the edge filling method.

Example

There follows a description of a specific example for the method according to the invention in a manufacturing system according to the invention having a high-voltage electrode and a downstream water-cooled UV-LED bar. The printing space is completely closed and is accessible only via a hatch with a safety switch. The ionization is activated at the start of the printing operation and deactivated at the end of the printing operation. The process sequence corresponds to the sequence shown in FIG. 5. Ionization is effected by means of a 50 Hz AC voltage in the range up to 5000 V. The ionization system is designed such that direct contact does not constitute any risk to personnel. Possible stray currents are minimized to such a degree (<0.05 mA) that the system is classified as safe for use. Moreover, the switching-on and -off during the printing process and the door circuit avoids the possibility of an unpleasant electric shock. Ozone formed as a result of the ionization is led off directly from the printer, and so exposure of the working space around the printer is avoided. The ionization electrode is connected in a fixed manner to the x actuator of the printer and is thus always at the same distance from the print nozzles. The optimal distance in the assembled system is about 30 mm. For better ionization of the droplets in flight, the ionization rod is inclined in the range from 25° to 35° relative to the print nozzle. A UV-LED bar beyond the ionization bar serves to cure the silicone elastomer used. The UV-LED bar is deactivated in printing operation and is activated only during the curing operation. After the printing of every individual layer, the UV curing process is conducted. The UV-LED bar is moved here in the x direction at low height above the component surface. In this case, the ionization bar is likewise moved completely over the complete printed article. Consequently, complete deionization and curing is conducted in one operation after the printing of every individual layer. The UV-LED bar is likewise deactivated by the safety switch when the access door to the printing space is opened. The printing space housing made from UV-opaque Makrolon prevents pollution of the environment by UV radiation.

Mechanical vibrations of the carrier plate are recognized by the installed confocal measurement system during the printing process and, if necessary, the printing process is suspended or terminated in the event of excessive vibrations of the carrier plate. This is also used as a safety measure in order to recognize mechanical encroachment of personnel to the printing plate in the printing region.

REFERENCE SIGNS FOR THE FIGURES 1 print nozzle (e.g. jetting valve or dispensing dosage unit)
2 print materials (for example in the form of droplets as shown or in the form of an extruded strand)
3 (individual) layers of the shaped article
4 carrier plate
5 high-voltage electrode of the ionization system (e.g. rod-shaped ionization electrode)
6 tips of the high-voltage electrode of the ionization system
7 ionization region (discharge region)
10 side view of manufacturing system with longitudinal electrode inclined by about 30°
11 annular high-voltage electrode (ionization electrode)
15 side view of manufacturing system with ring electrode
17 UV light source
18 additively manufactured shaped article or extrinsic component
19 print head
20 confocal lenses (of the confocal measuring unit)
21 carrier plate movement carriage in the x axis
23 y movement axis (e.g. linear module)
24 x movement axis (e.g. linear module)
25 holder (e.g. a rigid holder for a UV source and/or the ionization electrode and/or a confocal lens)
26 positioning unit (e.g. step motor with sensor)
27 top view of manufacturing system
28 edge region of extrinsic component
29 support and positioning geometry
30 holder of the carrier plate
31 vibration generator
32 print materials deposited (for example in the form of strands or droplets)
33 material front 1 (little relaxation)
34 material front 2 (increasing relaxation)
35 material front 3 (advanced relaxation)
36 front of the uppermost printed material layer (corresponding to the top side of the shaped article)
37 side view of manufacturing system in the operation of the edge filling method
38 extrinsic component

The invention claimed is:

1. A method for layer-by-layer production of a shaped silicone elastomer article, comprising the following steps:
   1) by means of a spatially independently controllable 3D printing device, in an x,y working plane, applying crosslinkable silicone print materials in the form of droplets or continuous strands via one or more print nozzles to a spatially independently controllable carrier plate, to an extrinsic component positioned thereon, or to a print material layer applied beforehand, wherein at least one of the print materials comprises a silicone elastomer curable by electromagnetic radiation;
   2) by means of at least one spatially independently controllable source of electromagnetic radiation, crosslinking or partly crosslinking the print materials applied, so as to form a layer of the cured or partly cured shaped silicone elastomer article;
   3) moving the print nozzle of the 3D printing device or the carrier plate in a z direction in a defined manner, such that a next print material layer can be applied in the x,y working plane;
   4) repeating steps 1) to 3) until the shaped silicone elastomer article is fully constructed,
   wherein steps 1), 2) and 3) are effected independently of one another or coupled to one another simultaneously or successively in any sequence, and wherein the print materials, after leaving the print nozzle and prior to contacting the carrier plate, the extrinsic component, or the print material layer applied beforehand, traverse a discharge region generated by means of an ionization system.

2. The method of claim 1, wherein in addition to a silicone elastomer print material, a second print material which is removable after completion of the shaped silicone elastomer article is applied as a support material.

3. The method of claim 2, wherein the discharge region covers part or all of the surface of the carrier plate, of the extrinsic component, or of a previously applied print material layer.

4. The method of claim 1, wherein the discharge region covers part or all of the surface of the carrier plate, of the extrinsic component, or of a previously applied print material layer.

5. The method of claim 1, wherein a controlled gas flow of ionizable gas is generated proceeding from the ionization system in the direction of the discharge region.

6. The method of claim 1, wherein the outer boundaries of the shaped silicone elastomer article are printed first to form an outlined interior, and then the outlined interior is filled completely or partly with print material.

7. The method of claim 6, characterized in that there is at least one extrinsic component present in the outlined interior.

8. The method of claim 7, wherein silicone the print material applied is subjected fully or partly to mechanical vibration prior to crosslinking or partial crosslinking.

9. The method of claim 1, wherein silicone the print material applied is subjected fully or partly to mechanical vibration prior to crosslinking or partial crosslinking.

10. The method of claim 1, wherein the discharge region is effective to remove electrostatic charges from the droplets or continuous strands applied from the one or more print nozzles.

11. The method of claim 1, wherein the discharge region is ineffective to cause curing of the droplets or continuous strands applied from the one or more print nozzles prior to crosslinking in step 2).

12. The method of claim 1, where the silicone elastomer is a liquid, addition-curable elastomer curable by UV light, and having a viscosity at 25° C. and a shear rate of 0.5 $s^{-1}$ of at least 200 Pa·s.

13. The method of claim 1, where the silicone elastomer is a liquid, addition-curable elastomer curable thermally, and having a viscosity at 25° C. and a shear rate of 0.5 $s^{-1}$ of at least 200 Pa·s.

\* \* \* \* \*